(12) United States Patent
Kubo et al.

(10) Patent No.: US 6,947,176 B1
(45) Date of Patent: Sep. 20, 2005

(54) METHOD FOR CORRECTING LIGHTNESS OF IMAGE

(75) Inventors: Noboru Kubo, Ikoma (JP); Xiaomang Zhang, Tenri (JP); Hiroyuki Okuhata, Osaka (JP); Akimasa Niwa, Osaka (JP)

(73) Assignees: Sharp Kabushiki Kaisha, Osaka (JP); Synthesis Corporation, Osaka (JP)

( * ) Notice: Subject to any disclaimer, the term of this patent is extended or adjusted under 35 U.S.C. 154(b) by 1072 days.

(21) Appl. No.: 09/652,154

(22) Filed: Aug. 31, 2000

(30) Foreign Application Priority Data

Aug. 31, 1999 (JP) ................... 11-246793

(51) Int. Cl.⁷ .............................. H04N 1/40
(52) U.S. Cl. ..................... 358/1.9; 382/279
(58) Field of Search ............... 358/1.9, 1.15, 358/2.1; 382/276–282

(56) References Cited

U.S. PATENT DOCUMENTS 4,384,336 A * 5/1983 Frankle et al. ............. 382/302

2003/0072496 A1 * 4/2003 Woodell et al. ............. 382/260
2003/0138161 A1 * 7/2003 Rising, III .................. 382/265

OTHER PUBLICATIONS

Daniel J. Johnson et al; IEE Transactions On Image Processing; vol. 6, No. 3; pp. 451-462 (Mar. 1997).
Daniel J. Johnson et al; IEE Transaction On Image Processing; vol. 6, No. 7; pp. 965- 976 (Jul. 1997).

* cited by examiner

*Primary Examiner*—Thomas D. Lee
*Assistant Examiner*—Stephen Brinich
(74) *Attorney, Agent, or Firm*—Birch, Stewart, Kolasch & Birch, LLP.

(57) ABSTRACT

A method is provided for correcting lightness of an image using a multiscale retinex. Lightness of a subject pixel of an original image is corrected using a convolution operation of a surround function and surround pixels with respect to the subject pixel of the original image, and the convolution operation is performed over a plurality of scales. The surround function has a simplified model such that a value of the surround function is changed in a stepwise way along two axes orthogonal to each other.

13 Claims, 15 Drawing Sheets

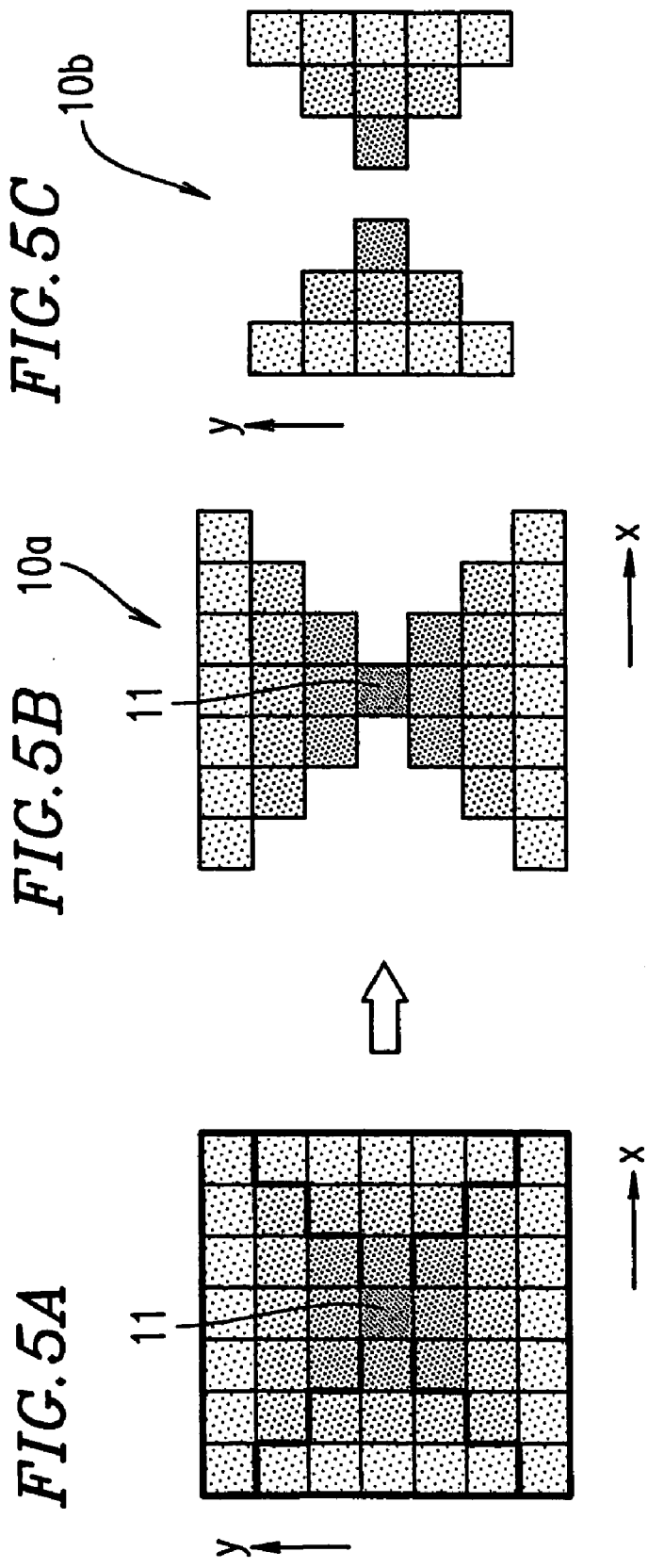

FIG.12
 : Retinex is performed
☐ : 's value is used
| Region 00 | Region 01 | ⋯ |
|-----------|-----------|---|
| Region 10 | Region 11 | ⋯ |

METHOD FOR CORRECTING LIGHTNESS OF IMAGE

BACKGROUND OF THE INVENTION

1. Field of the Invention

The present invention relates to a lightness correction method which is capable of correcting a digital still color image taken by a digital camera, a surveillance camera, or the like into the optimal dynamic range required.

2. Description of the Related Art

The retinex method has been proposed as a method for correcting lightness information, color information, or the like of a digital still color image. The retinex method models a retina of an eye. In this method, local information of an image is used to correct lightness of the image having biased dynamic range (dynamic characteristic). Specifically, lightness is increased for a portion of an image having low lightness while lightness is decreased for a portion of the image having high lightness, so that the image becomes easier to perceive.

Examples of the retinex method include a single-scale retinex (Daniel J. Jobson, et al., "Properties and Performance of a Center/Surround Retinex", IEEE Trans. on Image Processing, vol. 6, pp. 451–462, March 1997) and a multiscale retinex (Daniel J. Jobson et al., "A Multiscale Retinex for Bridging the Gap Between Color Images and the Human Observation of Scenes", IEEE Trans. on Image Processing, vol. 6, pp. 956–976, July 1997).

In the single-scale retinex, the spectral band component $I_i(x,y)$ (i=1,2 . . . ) of a pixel $I(x,y)$ (hereinafter referred to as a subject pixel) in an original image is corrected by a surround function $F(x,y)$ obtained based on information on surround pixels. The result of the retinex operation is represented by $$R_i = \log(I_i(x,y)) - \log[F(x,y)*I_i(x,y)] \quad (1)$$

where "*" denotes the convolution operation.

In this case, $F(x,y)$ is represented by $$F(x,y) = Ke^{-r^2/c^2} \quad (2)$$

where r denotes the distance between a pixel and a surround pixel ($r^2 = x^2 + y^2$), c denotes the scale parameter, and K is the scala coefficient and selected such that $F(x,y)dxdy=1$, i.e., the total of the surround function is equal to 1.

The result of the single-scale retinex operation, $R_i(x,y)$, is obtained by expressions (1) and (2). Thereafter, the result $R_i(x,y)$ is converted into an appropriate dynamic range by correcting with correction parameters gain and offset, using the following expression (3). A corrected result of a retinex operation, $I_{R_i}$, is represented by $$I_{R_i} = \text{Gain} \times R_i + \text{Offset} \quad (3).$$

Thus, in the single-scale retinex (SSR), the spectral band component of a subject pixel is processed based on the surround function. The multiscale retinex (MSR) provides the retinex having N scales for the spectral band component Ii of a subject pixel. In the MSR, the result of the MSR operation is a weighted sum of the results of the SSR operations having the N scales. The result of each SSR is weighted by the weight $w_n$. The result of the MSR, $R_{MSR_i}$ is represented by $$R_{MSR_i} = \sum_{n=1}^{N} \omega_n R_{n_i} \quad (4)$$

Similar to the SSR, the result of the MSR, $R_{MSR_i}$, calculated by expression (4) is converted into an appropriate dynamic range by correcting with the correction parameters gain and offset. A corrected result of the MSR operation, $I_{MSR_i}$, is represented by $$I_{MSR_i} = \text{Gain} \times R_{MSR_i} + \text{Offset} \quad (5).$$

In the MSR, the calculation of the SSR is performed a given number of times, which is equal to the number of scales (N), so as to correct a subject pixel. In other words, the N surround functions are calculated for a pixel. Therefore, if the number of scales is large, about half of the pixels in the entire image may need to be referred to as the surround pixels so as to perform the MSR operation for a subject pixel. The number of pixels to be referred to increases in proportion to the second power of the length of a scale as well as the length of the image.

The MSR needs the log operation, the exponential operation, and the sum-of-products operation which are required in the convolution operation. The increased number of surround pixels to be referred leads to a vast amount of calculation. The number of accesses to a memory which stores the results of the operations is increased. Moreover, a large volume of memory is required to store information on the two-dimensional surround pixels, intermediate results of the operations, and the like, thereby reducing cost efficiency. The increased number of accesses to a memory is also likely to increase the processing time.

In particular, recently, high picture-quality digital cameras having about one or two mega pixels have been developed. Such cameras require longer time for the MSR operation.

SUMMARY OF THE INVENTION

According to an aspect of the present invention, a method for correcting lightness of an image using a multiscale retinex is provided, wherein lightness of a subject pixel of an original image is corrected using a convolution operation of a surround function and surround pixels with respect to the subject pixel of the original image, and the convolution operation is performed over a plurality of scales; and the surround function has a simplified model such that a value of the surround function is changed in a stepwise way along two axes orthogonal to each other.

In one embodiment of this invention, a sum of image information on the surround pixels positioned at the same distance from the subject pixel and the surround function based on a one-dimensional scale size, the value of the surround function changing in a stepwise way, are subjected to the convolution operation, and a result of the convolution operation is used as a result of another convolution operation.

In one embodiment of this invention, the image information on the surround pixels are read as horizontal and vertical vector components changing along the two axes in a stepwise way.

In one embodiment of this invention, a scala coefficient K of the surround function used in the convolution operation is calculated based on data dependency on the scala coefficient K previously calculated.

In one embodiment of this invention, the number of the surround pixels to be read out is decreased to reduce the calculation amount of sum-of-products operation in the convolution operation.

In one embodiment of this invention, only one subject pixel is selected with respect to a pixel group consisting of a number of pixels; the convolution operation is performed for the subject pixel; the result of the convolution operation is used as a result of the convolution operation for the other pixels in the pixel group.

In one embodiment of this invention, the log operation in the multiscale retinex is approximately calculated based on a predetermined graph.

Thus, the invention described herein makes possible the advantages of providing a method for correcting lightness of an image, in which (1) the calculation amount of the MSR can be reduced, thereby significantly reducing the processing time; (2) the memory amount for storing the results of the operations can be reduced, thereby obtaining a low-cost apparatus.

These and other advantages of the present invention will become apparent to those skilled in the art upon reading and understanding the following detailed description with reference to the accompanying figures.

BRIEF DESCRIPTION OF THE DRAWINGS

FIG. 5A is a diagram for explaining a scale to be divided into horizontal and vertical vector components in the simplified model of the surround function.

FIG. 5B is a diagram for explaining the horizontal vector component.

FIG. 5C is a diagram for explaining the vertical vector component.

FIG. 12 is a diagram for explaining a method of reducing the number of times of the convolution operation.

DESCRIPTION OF THE PREFERRED EMBODIMENTS

Hereinafter, embodiments of the present invention will be described with reference to the accompanying drawings.

In a lightness correction method according to this invention, the spectral band components of a pixel in an original image are processed by the MSR to correct the lightness of the pixel. The MSR uses a surround function selected based on the scale size. The surround function is also based on the distance between a subject pixel which is the subject of the lightness correction and surround pixels which surround the subject pixel. In a typical MSR, a surround function as shown in FIG. 1A is used.

Figure 1C:
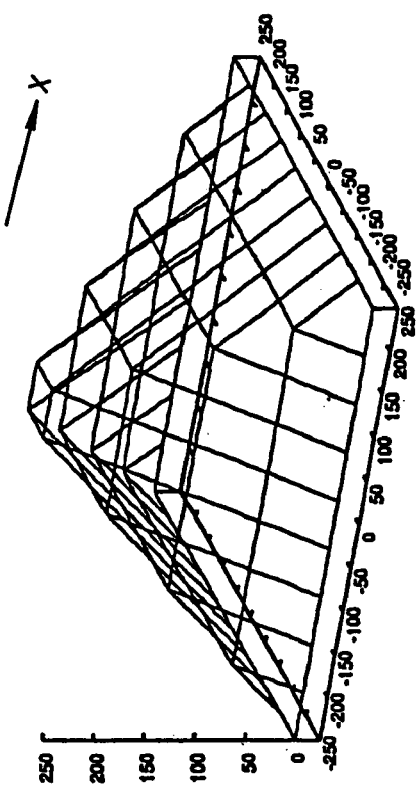
FIGS. 1C and 1D are diagrams showing a simplified model of the surround function shown in FIGS. 1A and 1B.
Figure 1D:
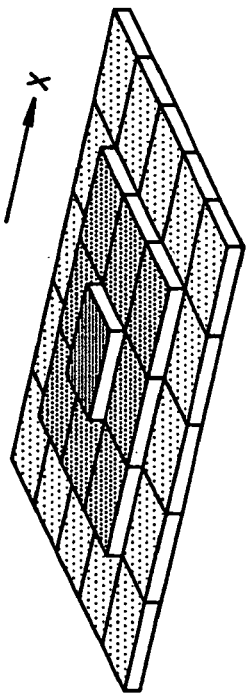
Figure 1A:
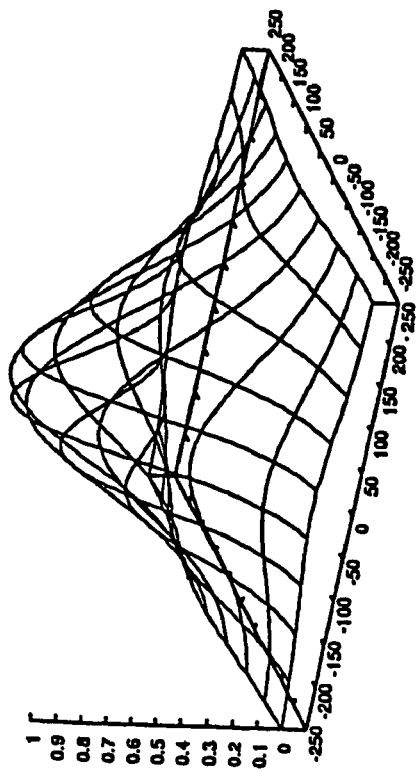
FIGS. 1A and 1B are diagrams showing a surround function.
Figure 1B:
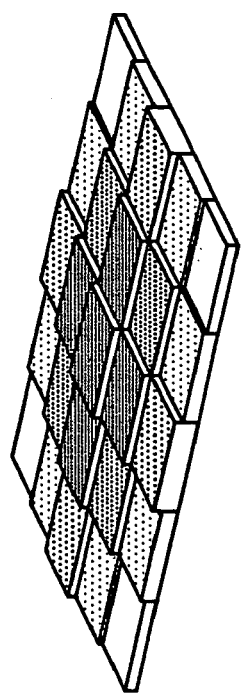

As shown in FIG. 1B, the surround function is digitized to have discrete values corresponding to the respective pixels each of which is defined as a square region.

On the other hand, in the lightness correction method of this invention, the MSR uses a surround function as shown in FIG. 1C. This surround function is a simplified model of the surround function as shown FIG. 1A. As shown in FIG. 1C, the value of the surround function is changed in a stepwise way along the two axes (x-axis and y-axis) orthogonal to each other. As shown in FIG. 1D, the surround function is digitized to have discrete values corresponding to the respective pixels each of which is defined as a square region.

Figure 2:
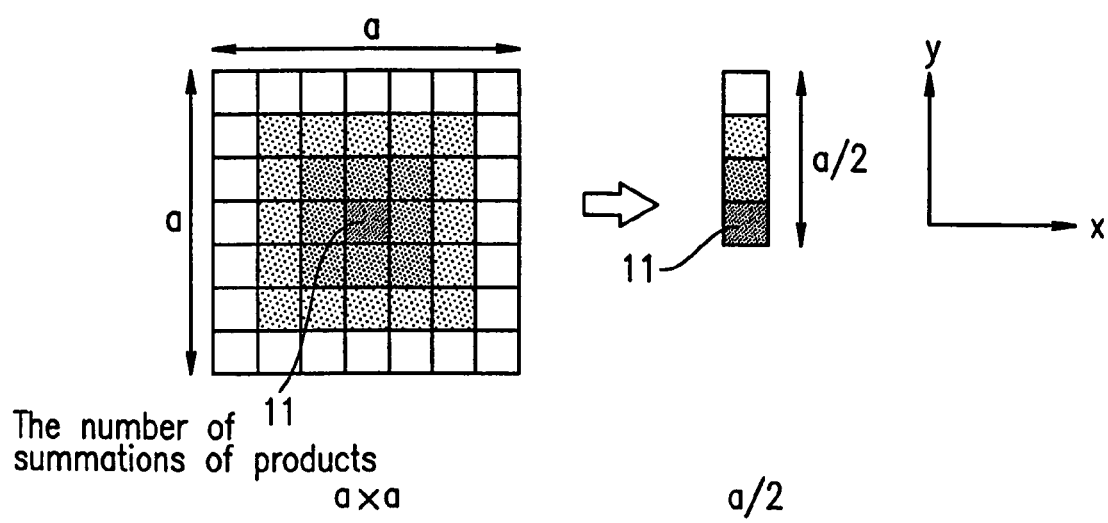
FIG. 2 is a diagram for explaining a reduction of the simplified model of the surround function into one dimension.

In the discrete surround function shown in FIG. 1D, the value of the surround function is decreased as a surround pixel is positioned away from a subject pixel along the two directions (x-axis direction and y-axis direction) orthogonal to each other. In addition, the value of the surround function is decreased in a stepwise way so that the further the position of the surround pixel, the lesser the contribution of the image information of the surround pixel on the retinex output. For example, FIG. 2 shows a surround function having an axa scale (corresponding to axa pixels). The further the position of a surround pixel away from a subject pixel 11 along each of the x-axis direction and the y-axis direction, the smaller the corresponding value of the surround function. The value of the surround function is decreased in a stepwise way. The values of the surround function for the pixels positioned on the circumference of a square having the center on the subject pixel 11 are equal to each other.

As a result, in the scale of axa pixels, the pixels having the same value of a surround function can be added up when performing the convolution operation between the surrounding function and the center and surround pixels.

For this reason, the two dimensional convolution operation can be replaced with a one-dimensional convolution operation.

Therefore, in the scale of axa pixels, for example, when the convolution operation is performed for the overall pixels in the two-dimensional region, the number of summations of products is axa. In this invention, the number of summations of products in the convolution operation is decreased to a/2. For this reason, the time consumed by the operation is significantly reduced. In addition, the memory for storing the intermediate data is significantly reduced since summation of products for the surround pixels in the one-dimensional region, and the like are stored.

Figure 3:
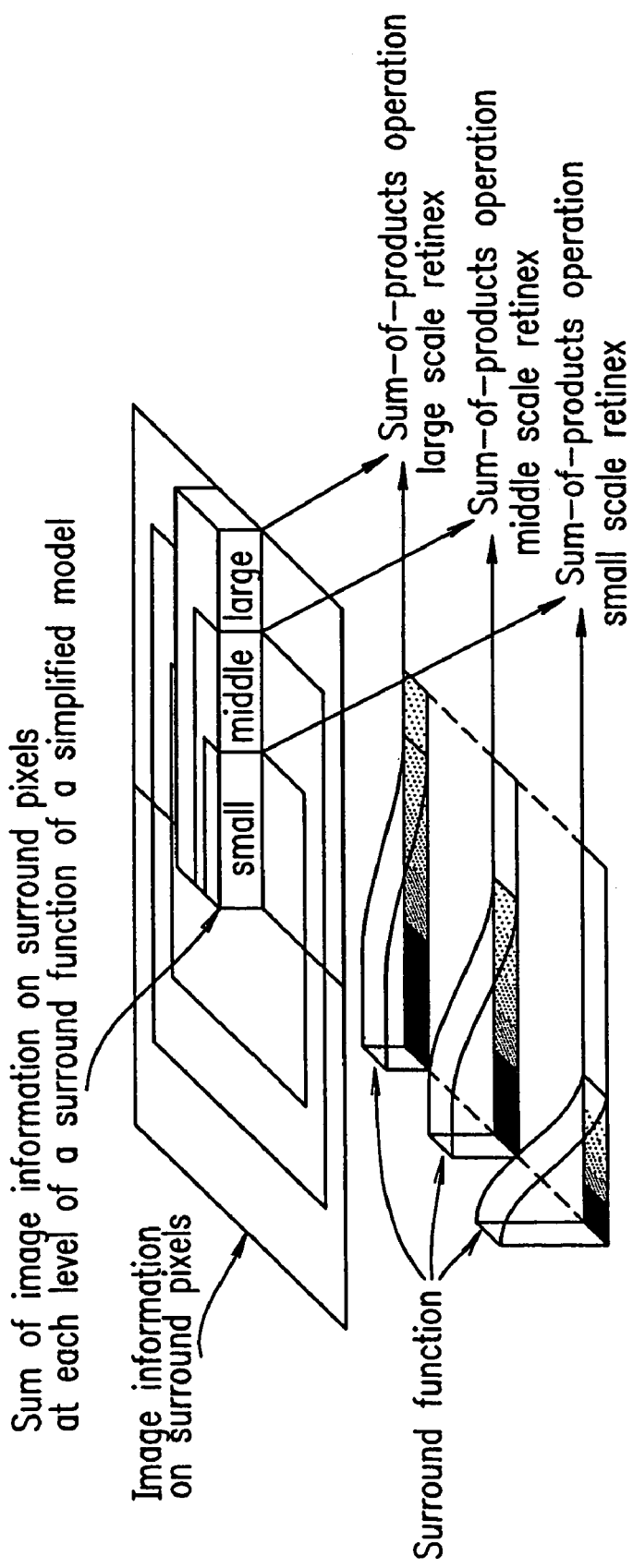
FIG. 3 is a diagram for explaining the convolution operation in a MSR based on the simplified model of the surround function.

Thus, when the simplified model of the surround function is used, the image information of the surround pixels does not need to be stored for all scales as shown in FIG. 3. In this case, the image information of the surround pixels for a large scale includes the image information of the surround pixels for a smaller scale (small and middle). Therefore, when the image information of the surround pixels only for the maximum scale is stored, any smaller scale having a reduced size do not require a new calculation. As a result, it is possible to avoid overlaps of the same image information of the surround pixels between different scales, thereby significantly reducing the required memory capacity.

Thus, in the MSR using the simplified model of the surround function, the calculation amount and the memory capacity for the convolution operation substantially do not depend on the size of a scale and the number of scales and is therefore reduced to as small as those required in the SSR.

Figure 4:
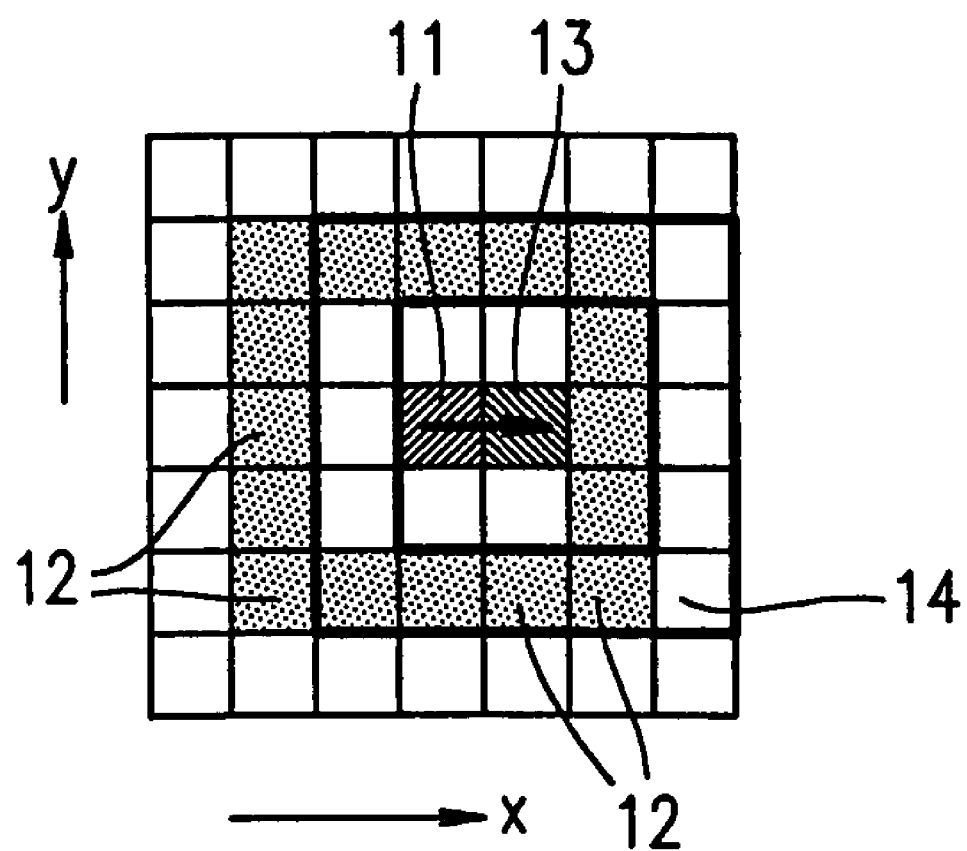
FIG. 4 is a diagram for explaining an overlap of surround pixels in the simplified model of the surround function.

Further, in the simplified model of the surround function, a portion of the image information which has been used in the previous convolution operation is used in the current convolution operation using the same scale. For example, as shown in FIG. 4, it is assumed that the image information of surround pixels 12 positioned along the y-axis direction and the x-axis direction while equally spaced in the x-axis direction and the y-axis direction, respectively (indicated by shading in FIG. 4) have been used in the previous convolution operation. In the current convolution operation, when a subject pixel 13 is adjacent to a previous subject pixel 11 of the previous operation in the x-axis direction, surround pixels 14 surrounded by a black border are used in the current convolution operation. In this case, the result of the previous convolution operation is used again for four surround pixels positioned each on the upper and lower sides along the x-axis.

For this reason, there is an overlaps of 8 (50%) pixels between the 16 surround pixels 12 with respect to the subject pixel 11 and the 16 surround pixels 14 with respect to the subject pixel 13, when the subject pixels 11 and 13 are adjacent to each other. Thus, 50% of the image information of the surround pixels 12 which was used in the previous operation can be used again, thereby significantly reducing the number of accesses to a memory.

The image information of the surround pixels may be obtained by synthesizing a horizontal vector component obtained by scanning along the x-axis direction and a vertical vector component obtained by scanning along the y-axis direction. For example, as shown in FIG. 5A, it is assumed that a scale is composed of 7×7 pixels. Image information on surround pixels in a portion of the scale shown in FIG. 5B is read out as a horizontal vector component $10a$ by scanning along the x-axis direction. Image information on surround pixels in a portion of the scale shown in FIG. 5C is read out as a vertical vector component $10b$ by scanning along the y-axis direction. Thereafter, the horizontal vector component $10a$ and the vertical vector component $10b$ are synthesized to obtain the entire image information on the surround pixels for a current subject pixel.

In this case, the horizontal vector component $10a$ is composed of a subject pixel 11; two sets of 3 surround pixels adjacent to each other, each set positioned on the y-axis side of the subject pixel 11 opposite each other; two sets of 5 surround pixels adjacent to each other, each set positioned on the outer side (y-axis side) of the respective sets of 3 surround pixels; and two sets of 7 surround pixels adjacent to each other, each set positioned on the outer side (y-axis side) of the respective sets of 5 surround pixels.

The vertical vector component $10b$ is composed of the image information on the 7×7 pixels except for the subject pixel 11 and surround pixels included in the horizontal vector component $10a$, i.e., 18 pixels.

Figure 6A:
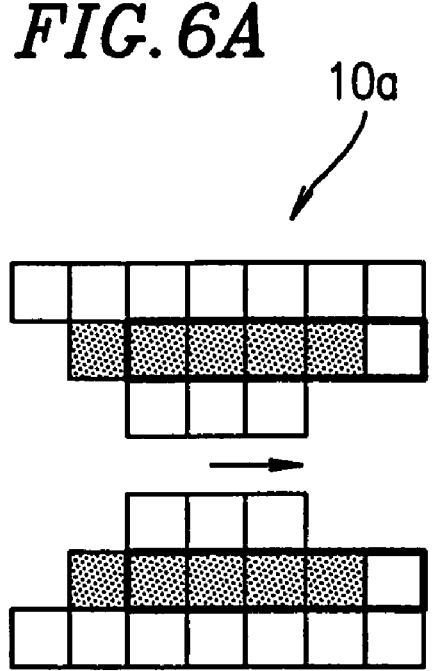
FIG. 6A is a diagram for explaining an overlap of the horizontal vector component of surround pixels.
Figure 6B:
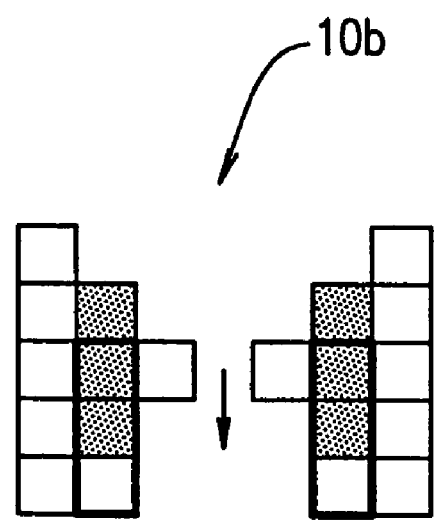
FIG. 6B is a diagram for explaining an overlap of the vertical vector component of surround pixels.

As described above, the image information on the surround pixels for the current subject pixel are divided into the horizontal and vertical vector components $10a$ and $10b$ which are in turn read separately. In this case, when the current subject pixel is adjacent to the previous subject pixel in the x-axis direction as shown in FIG. 6A, there is a large overlap in each level of the surround function between the horizontal vector components of the current scale and the previous scale (high overlap ratio) (the overlap portions between the surround pixels indicated by shading and the surround pixels surrounded by the black border). When the current subject pixel is adjacent to the previous subject pixel in the y-axis direction as shown in FIG. 6B, there is a large overlap in each level of the surround function between the vertical vector components of the current scale and the previous scale (high overlap ratio) (the overlap portions between the surround pixels indicated by shading and the surround pixels surrounded by the black border). The information on the surround pixels is hold as a sum of information on the whole pixels in each level of the surround function.

Figure 7:
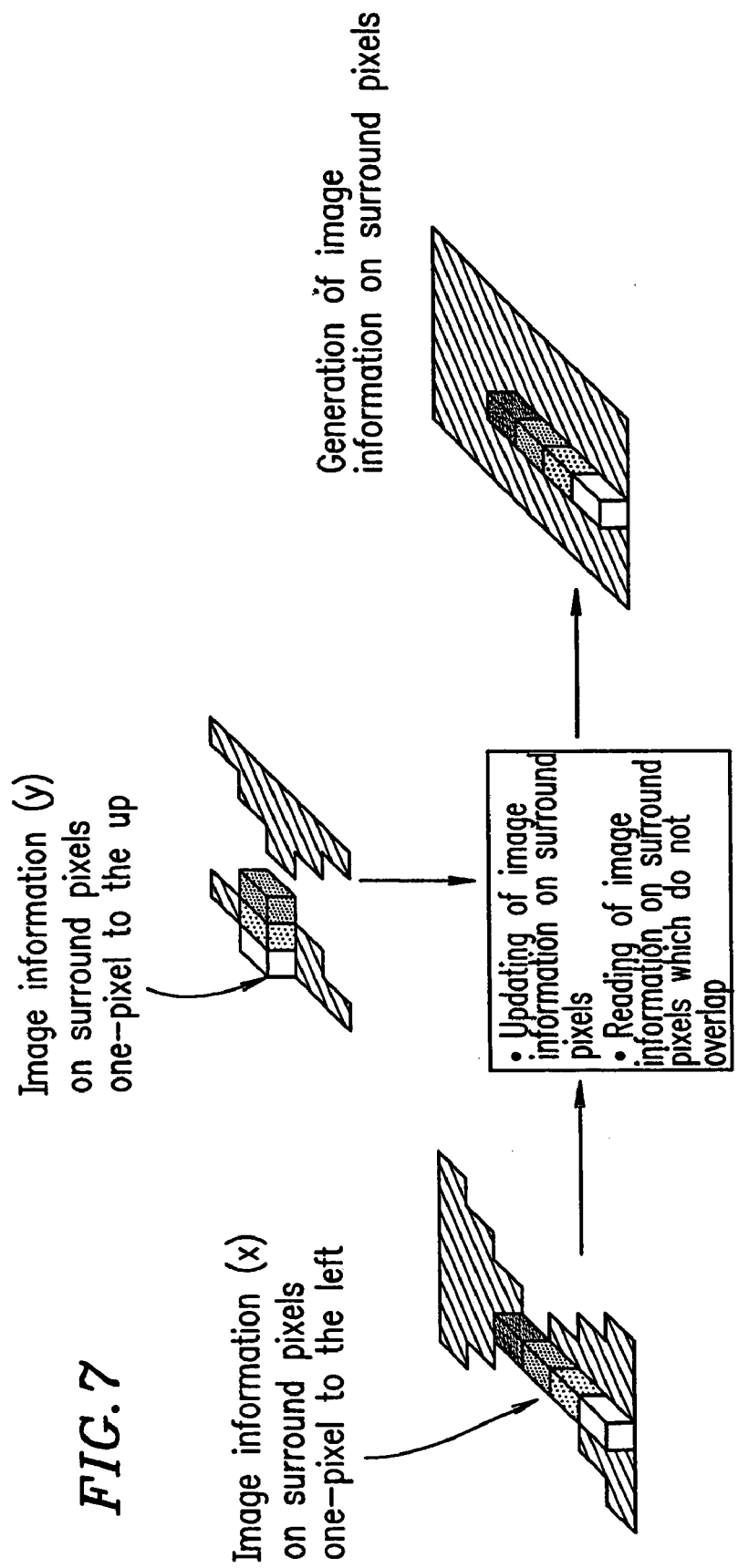
FIG. 7 is a diagram for explaining generation of image information on a surround pixel from the horizontal and vertical vector components.

Accordingly, as shown in FIG. 7, the information on the surround pixels is updated using the image information on the overlapped surround pixels. When the current subject pixel is shifted from the previous subject pixel by one pixel toward the downstream in the x-axis scanning direction (to the right), the overlaps between the current and previous horizontal vector components at each level of the surround function are used again for the updating. Similarly, when the current subject pixel is shifted from the previous subject pixel by one pixel toward the downstream in the y-axis scanning direction (to the bottom), the overlaps between the current and previous vertical vector components at each level of the surround function are used again for the updating. Image information on pixels of the current horizontal and vertical vector components, which pixels are not overlapped with those of the previous horizontal vertical vector components, are newly read out at each level of the surround function. The image information on the overlapped pixels and the new pixels are added with each other. Thus, one-dimensional image information on the overall surround pixels at each level of the surround function is generated for the current subject pixel.

Thus, the number of accesses to a memory is significantly reduced when the image information on the surround pixels is obtained. Therefore, it is possible to significantly reduce the processing time for obtaining the image information.

The overlap ratio of the image information between the surround pixels for the current subject pixel and the surround pixels for the previous subject pixel at each level of the surround function is the most efficient when a subject pixel is shifted by one pixel along the x-axis and then is shifted by one pixel in the y-axis direction. In this case, a buffer is required for holding the vertical vector component of the image information of the surround pixels which is read while the subject pixel is shifted along the x-axis direction.

After image information on surround pixels at each level of the surround function is obtained for a current pixel, the surround function F(x,y) is calculated in accordance with expression (2). The scala coefficient K used in the calculation of the surround function F(x,y) is designed to obtain F(x,y)dxdy=1. The value of K which is obtained in the previous calculation is utilized in the current calculation so as to calculate K at a high speed. The scala coefficient K is updated based on the data dependency between the scala coefficient K of the previous calculation and the scala coefficient K of the current calculation.

Figure 8A:
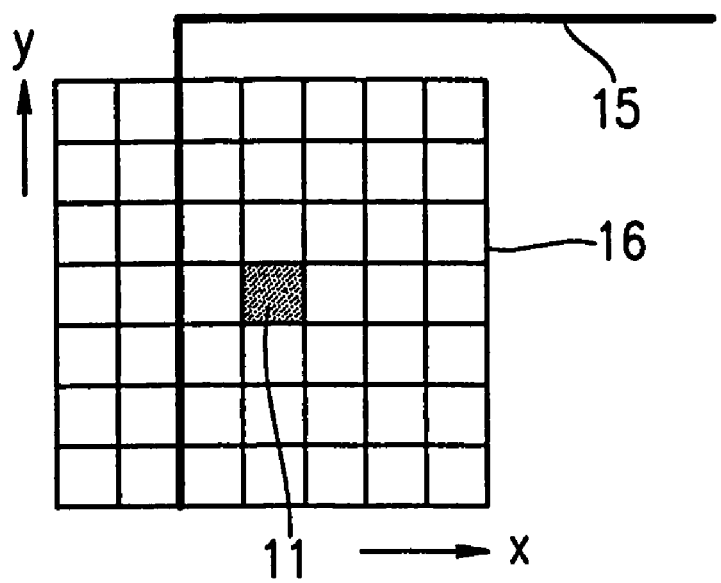
FIGS. 8A and 8B are diagrams for explaining a dependency relationship of image information in calculation of a scala coefficient K.

Referring to FIG. 8A, a subject pixel 11 is close to a corner of an image frame 15. Reference numeral 16 indicates a region which has a subject pixel 11 and over which the scala coefficient K is calculated and the convolution operation is performed. As shown in FIG. 8A, a part of the region 16 lies outside the image frame 15. The scala coefficient K is corrected based on the surround function in a part of the region 16 which lies inside the image frame 15. For another example, referring to FIG. 8B, a subject pixel 13 is adjacent to the subject pixel 11 in the x-axis direction. When the scala coefficient K is calculated for the subject pixel 13, values of the surround function in the region 17 positioned inside the image frame 15 is used for the subject pixel 13.

Figure 8B:
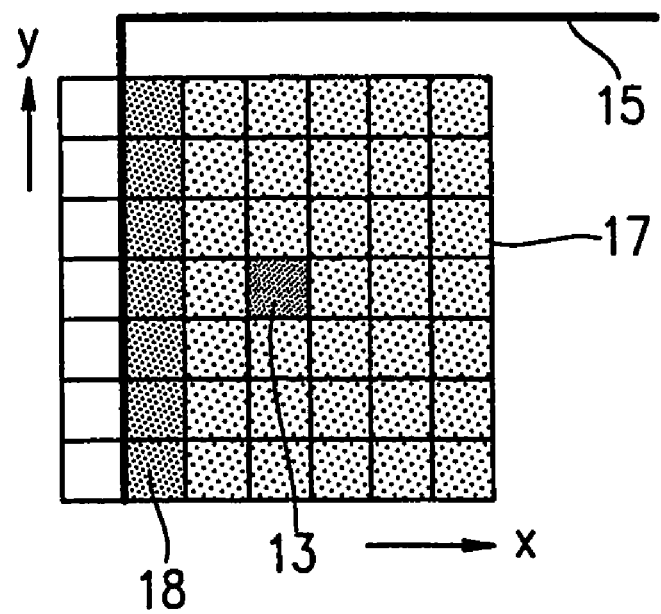

Accordingly, when the scala coefficient K is calculated for the subject pixel 13, only values of the surround function corresponding to pixels 18 along the y-axis direction in the image frame 15 are additionally used for calculating the scala coefficient K from the subject pixel 11 as shown in FIG. 8B. With the data dependency, the scala coefficient K for the subject pixel 11 is utilized for updating the scala coefficient K for the subject pixel 13.

Figure 9:
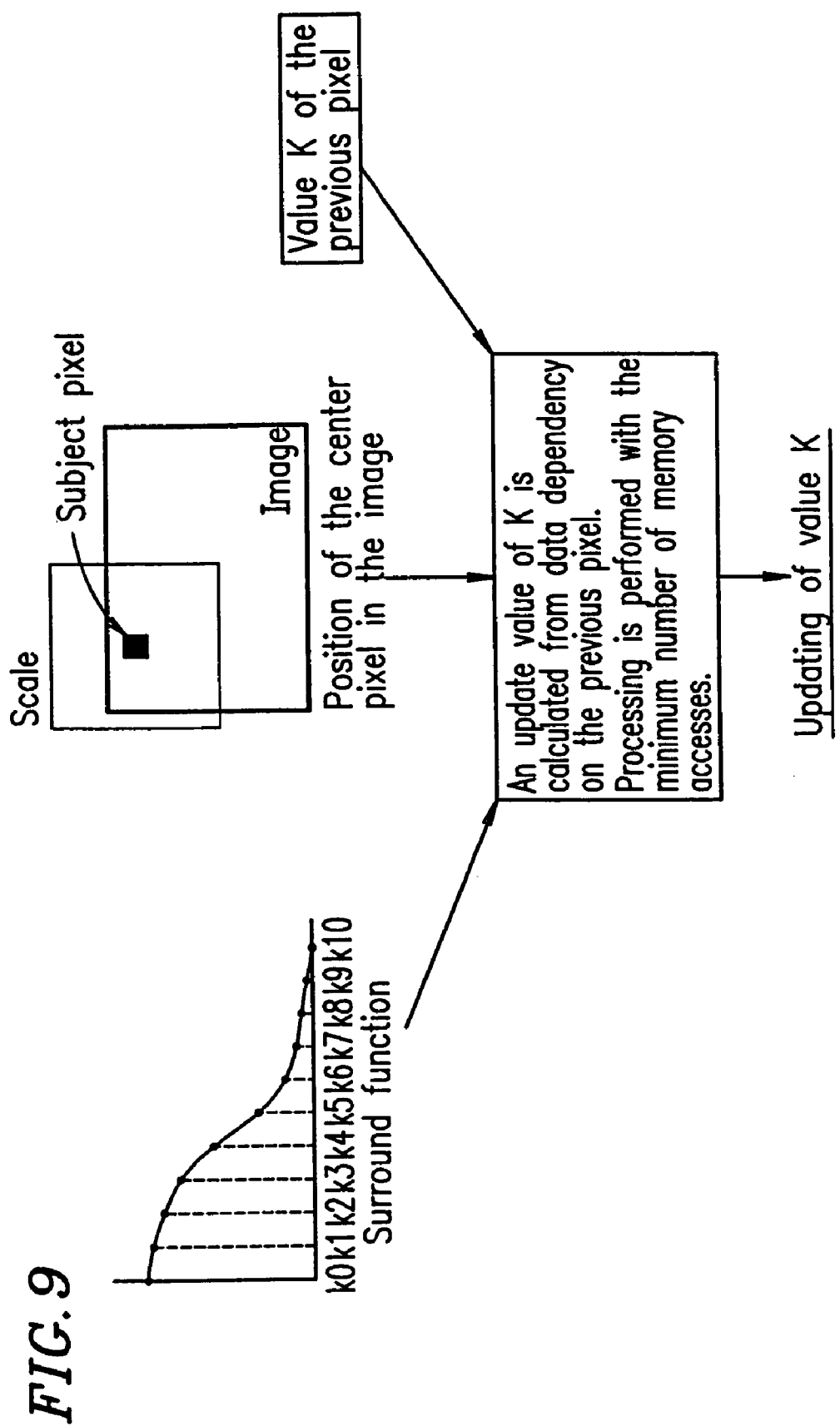
FIG. 9 is a block diagram for explaining the updating of the scala coefficient K.

The scala coefficient K is specifically updated as follows. Referring to FIG. 9, the values of the surround function which have been used for the previous subject pixel are stored in a one-dimensional table. The values of the surround function used for updating the scala coefficient K are selected based on the relationship between the position of the current subject pixel relative to the image frame and the scale size.

Figure 10:
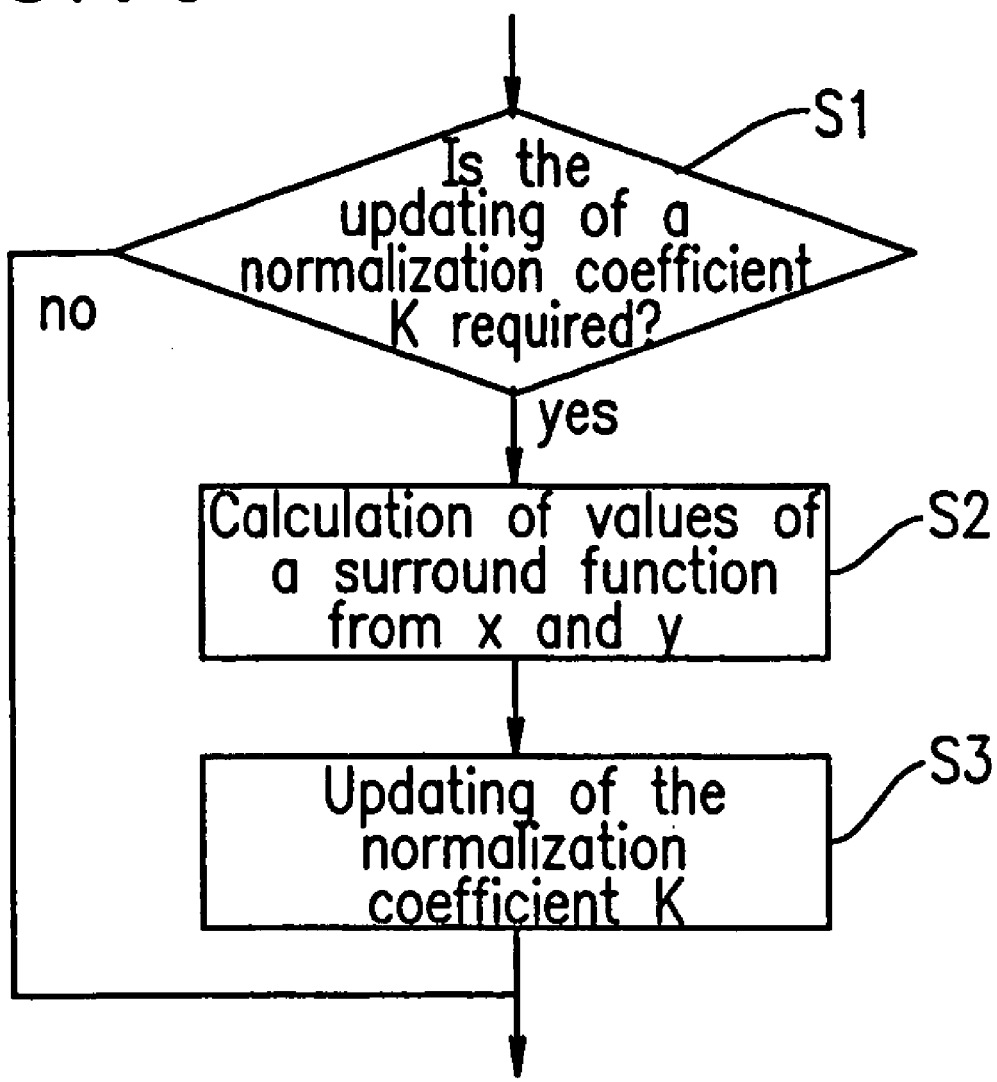
FIG. 10 is a flowchart for explaining a method of updating the scala coefficient K.

FIG. 10 is a flowchart showing the updating of the scala coefficient K. Initially, it is determined whether the updating of the scala coefficient K is required based on the coordinate (x,y) of the subject pixel and the scale size (step S1 in FIG. 10). Specifically, whether the scale for the subject pixel lies outside the image frame is determined based on the position of the subject pixel and the scale size. If so, the scala coefficient K is updated as follows. The surround function is calculated based on the coordinate (x,y) of the subject pixel (step S2). The scala coefficient K is updated on the calculated surround function (step S3).

In this case, as described above, the scala coefficient K is calculated by scanning in a way similar to the scanning for reading out the horizontal and vertical vector components of the surround pixels. This requires only a buffer for holding the surround function for a current subject pixel.

Figure 11:
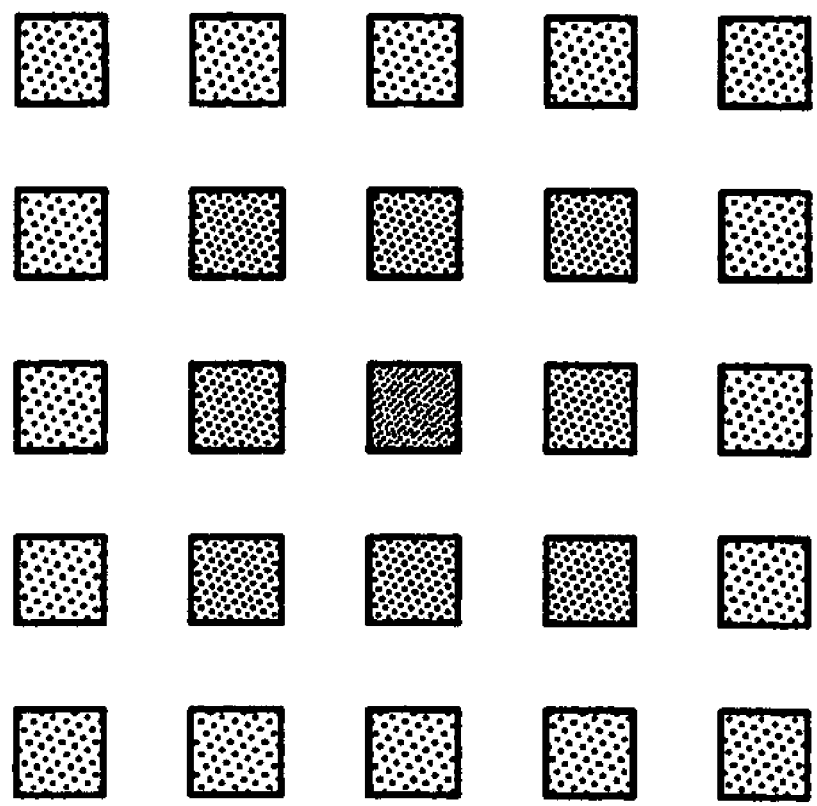
FIG. 11 is a diagram for explaining a method of reducing the number of times of sampling image information.

Further, the number of times of sampling the image information on the surround pixels may be reduced as much as the picture quality of the image is not degraded, thereby significantly reducing the calculation amount. Specifically, when F(x,y)*I(x,y) in expression (1) is calculated, image information on some surround pixels is appropriately omitted as shown in FIG. 11, thereby significantly reducing the number of times of sampling the image information on the surround pixels and the calculation amount. For instance, image information on one surround pixel is sampled for 16 (4×4) surround pixels.

Further, similar to the case when the number of times of sampling the image information on the surround pixels, part of the convolution operation may be omitted as long as the picture quality is not degraded, thereby reducing the calculation amount. To this end, the second term of the retinex operation is carried out for only one pixel per 16 (4×4) surround pixels constituting a square group of pixels as shown in FIG. 12. The calculation result for the selected pixel is used for the second term of the retinex operation for each of the other 15 surround pixels when it is selected as a subject pixel. This leads to a significant reduction in the calculation amount of the convolution operation.

Figure 13A:
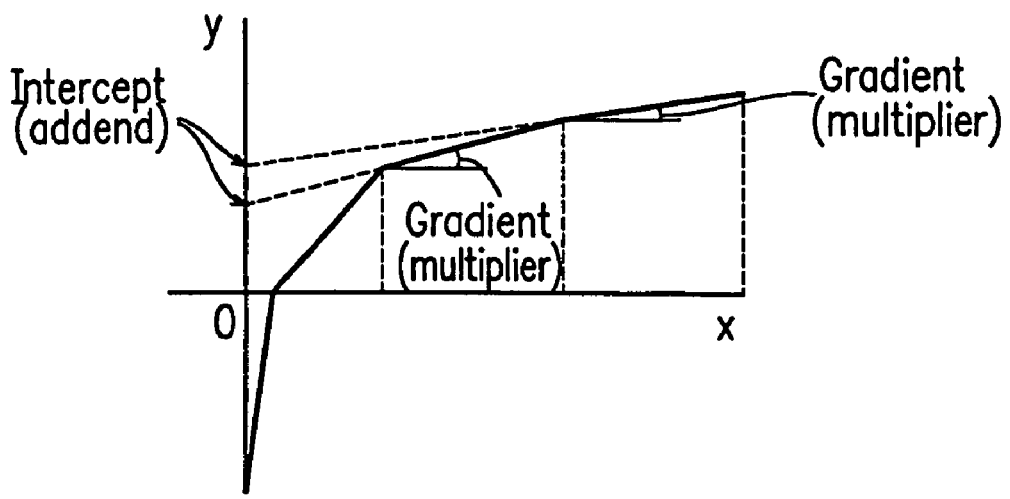
FIG. 13A is a graph used for simplifying the log operation.
Figure 13B:
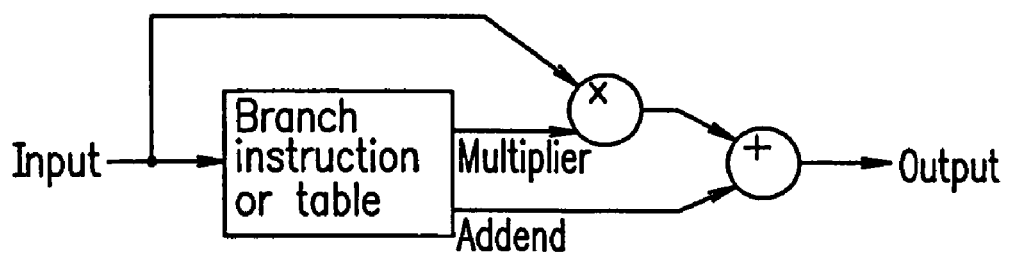
FIG. 13B is a control diagram of the the log operation using the graph shown in FIG. 13A.

The log operation may be approximated by the sum-of-products operation so as to further reduce the calculation amount. Referring to FIG. 13A, the operation of y=logx in different ranges along the x-axis is approximated by lines having different gradients. Referring to FIG. 13B, the gradient of a line and the y intercept are calculated for a value of x. The calculated gradient and y intercept are a multiplier and an addend, respectively. A vast number of indexes do not need to be prepared for providing for a dynamic range of an appropriate display.

Figure 14:
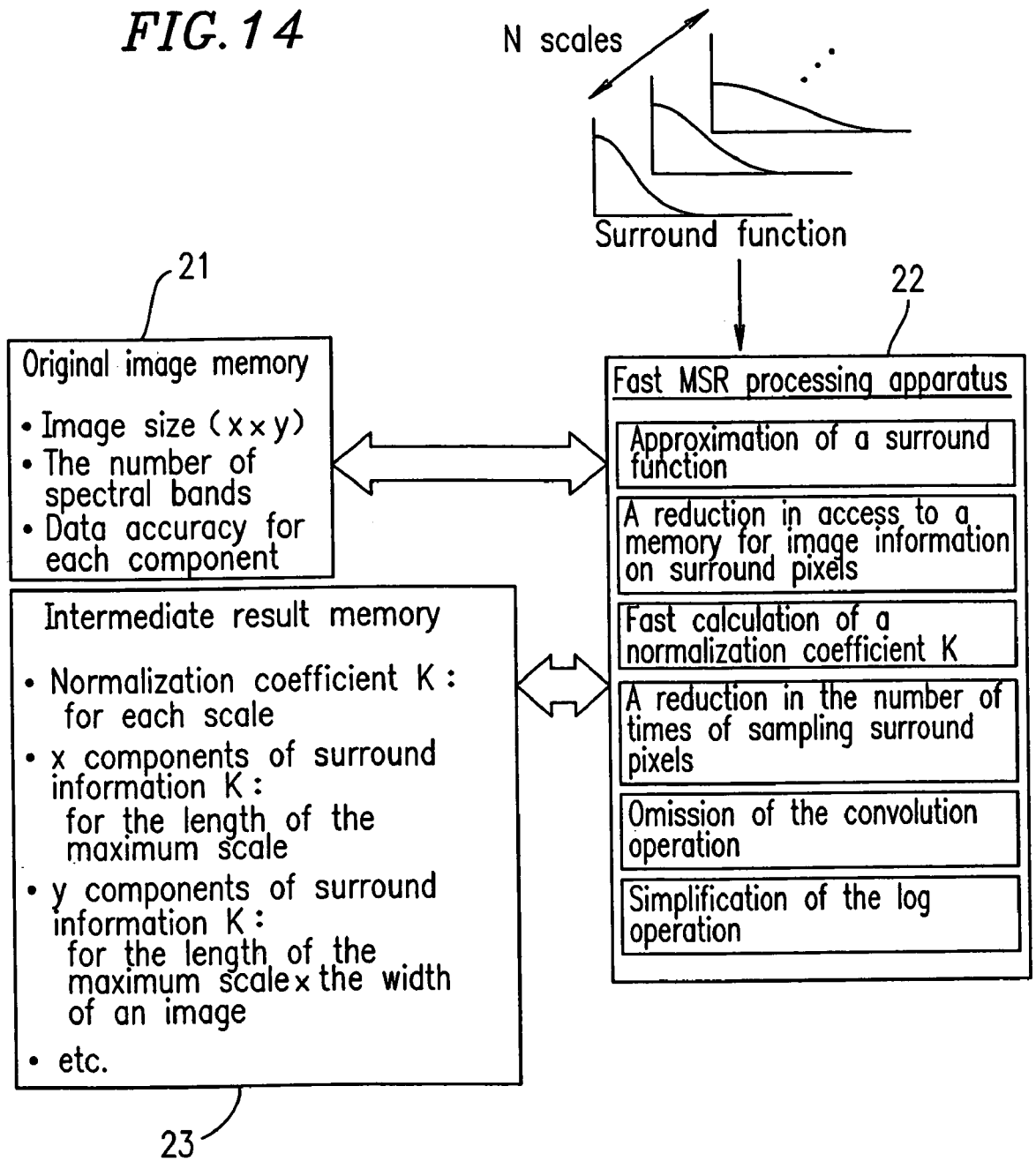
FIG. 14 is a block diagram showing an example of a correction system used for performing a method according to the present invention for correcting lightness of an image.

FIG. 14 shows an example of a lightness correction system in which the above-described lightness correction method is practiced. The lightness correction system includes a memory 21 for storing information on an original image; a fast MSR operation apparatus 22; and a memory 23 for temporarily storing intermediate results.

The original image memory 21 stores the image size (x,y) of the original image, the number of spectral bands of each pixel, data accuracy for each component of a color image, and the like. The intermediate result memory 23 stores scala coefficient s K the number of which is equal to the number of scales; the x components (the horizontal vector component 10a, see FIG. 5B) of the image information on the surround pixels over the maximum scale length; the y components (the vertical vector component 10b, see FIG. 5C) of the image information on the surround pixels over the maximum scale length×the width of the image; and the like.

The fast MSR operation apparatus 22 carries out the MSR operation at a high speed based on the surround functions the number of which is equal to the number of scales. As described above, the approximation of each surround function; a reduction in the number of accesses to obtain information on the surround function; the fast calculation of the scala coefficient K; a reduction in the number of times of sampling the image information on the surround pixels; the omission of the convolution operation; the simplification of the log operation; and the like.

Figure 15:
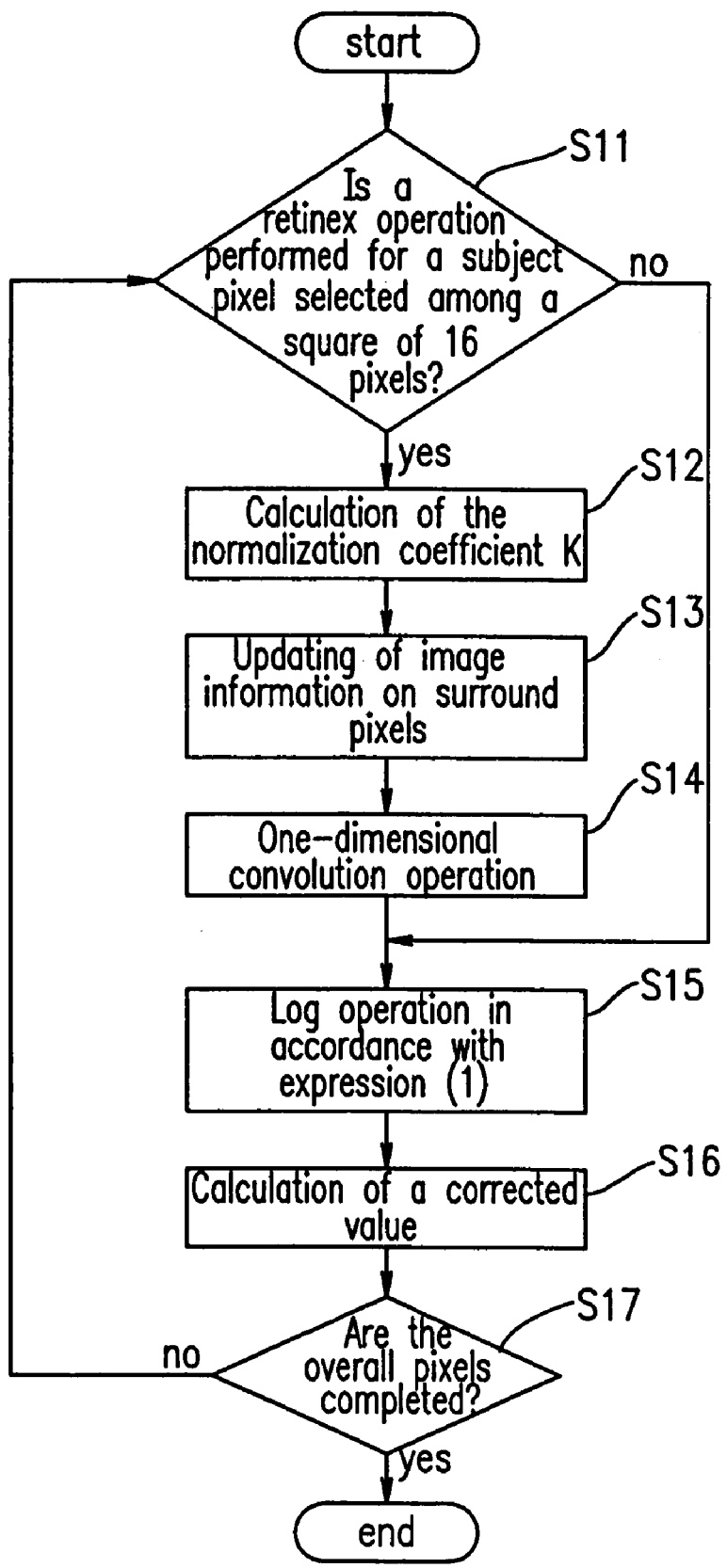
FIG. 15 is a flowchart for explaining the operation of the correction system shown in FIG. 14.

FIG. 15 is a flowchart for explaining the operation of the above-described lightness correction system. In the lightness correction system, for instance, the retinex operation is carried out for one pixel per 16 (4×4) pixels which is a square group of pixels. Whether the retinex operation is carried out for a subject pixel is decided (step S11). When it is decided that the retinex operation is carried out for a selected subject pixel, the scala coefficient K is calculated for the subject pixel. When the current subject pixel and the previous center point are symmetrical with respect of the center of the image, the scala coefficient K of the current subject pixel is equal to that of the previous subject pixel. The calculation of the scala coefficient K depends on the position of the subject pixel. Therefore, a buffer for holding the scala coefficient K only needs to have a size such that the scala coefficient K for the maximum large scale can be held.

After the calculation of the scala coefficient K, image information on the surround pixels is updated (step S13). For the updating, image information with respect to the previous subject pixel, which is positioned to the left or up of the current pixel, are used again. One-dimensional convolution operation is then carried out based on the updated image information on the surround pixels (step S14).

After the one-dimensional convolution, 16 pixels including the subject pixel are subjected to the operation based on expression (1) (step S15). The log operation is carried out using the above-described approximation. Thereafter, a correction value is calculated for the result of the retinex operation (step S16). The result of the retinax operation is corrected with the correction value. The above-described operation is repeated for the overall pixels to correct the lightness of the image (step S17).

According to the method of the present invention for correcting the lightness of an image, the calculation amount for correcting the lightness of each pixel using the MSR is significantly reduced. In addition, the number of accesses to a memory is significantly reduced. The processing time is thus significantly reduced. Further, necessary memory capacity is reduced, so that a memory having a small capacity can be used, thereby obtaining a low-cost correction apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for correcting lightness of an image using a multiscale retinex wherein lightness of a subject pixel of an original image is corrected using a convolution operation of a surround function and surround pixels with respect to the subject pixel of the original image, and the convolution operation is performed over a plurality of scales; and
    the surround function has a simplified mode such that a value of the surround function is changed in a stepwise way along two axes orthogonal to each other.

2. A method according to claim 1, wherein a sum of image information on the surround pixels positioned at the same distance from the subject pixel and the surround function based on a one-dimensional scale size, the value of the surround function changing in a stepwise way, are subjected to the convolution operation, and a result of the convolution operation is used as a result of another convolution operation.

3. A method according to claim 1, wherein the image information on the surround pixels are read as horizontal and vertical vector components changing along the two axes in a stepwise way.

4. A method according to claim 1, wherein a scala coefficient K of the surround function used in the convolution operation is calculated based on data dependency on the scala coefficient K previously calculated.

5. A method according to claim 1, wherein the number of the surround pixels to be read out is decreased to reduce the calculation amount of sum-of-products operation in the convolution operation.

6. A method according to claim 1, wherein only one subject pixel is selected with respect to a pixel group consisting of a number of pixels; the convolution operation is performed for the subject pixel; the result of the convolution operation is used as a result of the convolution operation for the other pixels in the pixel group.

7. A method according to claim 1, wherein the multiscale retinex includes a log operation approximately calculated based on a predetermined graph.

8. The method of claim 1 wherein the surround function used in the convolution operation of the first subject pixel includes a first scala coefficient and including the additional step of using the first scala coefficient as a second scala coefficient for the surround function used in the convolution operation of a second subject pixel.

9. A multiscale retinex method for correcting image lightness comprising the steps of:
    selecting a first subject pixel from a plurality of pixels;
    identifying a first plurality of surround pixels related to the first subject pixel; and
    correcting the lightness of the first subject pixel using a convolution operation of a surround function and the first plurality of surround pixels over a plurality of scales;
    wherein the surround function has a value which changes in a stepwise manner along two orthogonal axes.

10. The method of claim 9 including the additional step of using the result of the convolution operation of the first subject pixel and the first plurality of surround pixels as the result of a convolution operation of a second subject pixel and a second plurality of surround pixels.

11. The method of claim 9 including the additional step of reading image information on the first plurality of surround pixels as horizontal vector components changing along the two orthogonal axes in a stepwise way.

12. The method of claim 9 including the additional step of selecting a first group of subject pixels and using a result of the convolution function for the first subject pixel as the result of the convolution operation for each pixel in the first group of subject pixels.

13. A multiscale retinex method for correcting image lightness comprising the steps of:
    selecting a subject pixel from a plurality of pixels;
    identifying a first plurality of surround pixels related to the subject pixel;
    identifying a second plurality of surround pixels related to the subject pixel; and
    correcting the lightness of the subject pixel using one-dimensional convolution operations of a surround function and a selected one of the first plurality of surround pixels over a plurality of scales and a selected one of the second plurality of surround pixels over the plurality of scales.

* * * * *